United States Patent [19]
Bryant

[11] Patent Number: 5,760,942
[45] Date of Patent: Jun. 2, 1998

[54] NOISE TOLERANT RECEIVER FOR WIDEBAND OPTICAL TRANSMISSION SYSTEM

[75] Inventor: Lawrence Matthias Bryant, Palo Alto, Calif.

[73] Assignee: Photonics Corporation, San Jose, Calif.

[21] Appl. No.: 563,351

[22] Filed: Nov. 28, 1995

Related U.S. Application Data

[63] Continuation of Ser. No. 224,277, Apr. 7, 1994, abandoned.

[51] Int. Cl.$^6$ .................... H04B 10/10; H04B 10/06
[52] U.S. Cl. .................... 359/193; 359/161; 359/194
[58] Field of Search .................... 359/161, 189, 359/193, 194, 195, 176

[56] References Cited

U.S. PATENT DOCUMENTS

| | | | |
|---|---|---|---|
| 4,229,831 | 10/1980 | Lacher | 359/195 |
| 4,531,239 | 7/1985 | Usui | 359/189 |
| 4,646,361 | 2/1987 | Usui | 359/136 |
| 4,648,135 | 3/1987 | Labrum | 359/189 |
| 4,679,251 | 7/1987 | Chown | 359/195 |
| 4,792,998 | 12/1988 | Toussaint | 359/189 |

OTHER PUBLICATIONS

Richard C. Allen, "Wireless LAN Medium Access Control (MAC) and Physical Specifications", IEEE Document #P802.11, 93/20; Mar. 1993.

*Primary Examiner*—Leslie Pascal
*Attorney, Agent, or Firm*—Haverstock & Owens LLP

[57] ABSTRACT

Reduction of lower frequency interfering signals including signals from fluorescent light systems can be achieved by an optical receiving system, before the detection process, by differentiating the signal and then using a modified detection process to detect the differentiated signal. At least one data channel is included in the optical receiving system, each data channel including an optical receiving transducer which receives optical transmissions from an optical transmitter positioned a distance away from the optical receiving system. From the transducer, the received signal is differentiated and amplified to remove unwanted interfering signals from the received signal before it is transmitted to a detector. The detector converts the differentiated and amplified signal into an output data stream which corresponds to the signal originally presented to the optical transmitter.

30 Claims, 15 Drawing Sheets

NOISE TOLERANT RECEIVER FOR WIDEBAND OPTICAL TRANSMISSION SYSTEM

This is a Continuation of application Ser. No. 08/224,277, now abandoned, filed on Apr. 7, 1994.

FIELD OF THE INVENTION

This invention relates to the field of communication by an optical data transmission system transmitting through air. More particularly, this invention relates to the field of operation of an optical data transmission system in the presence of interfering signals which occupy the lower frequency portion of the data transmission system's bandwidth such as from fluorescent lighting.

BACKGROUND OF THE INVENTION

A form of information, such as binary digital data, can be communicated by means of a visible or invisible light source which is modulated in some manner and is, in turn, exposed either directly or indirectly to some form of optical receiver which converts the light from the modulated optical source back into the desired form of information. Such a system represents an optical data transmission system and the modulated light can be conducted from the transmitter or modulated source to the optical receiver by means of optical light guides, optical fibers or through a medium such as air, gas or even a vacuum.

A wireless optical data transmission system is an optical data transmission system that does not use any wires or solid conductors to link the transmitter and receiver together. Two methods of wireless optical data transmission are currently in popular use. The first method, commonly referred to as direct transmission or baseband modulation, is implemented by directly controlling power to an optical emitting device, usually a light emitting diode (LED) or a LASER by controlling either the voltage across or the current through the optical emitting device in response to a serial data stream. This serial data stream is usually constructed from the original input data using one of several common encoding schemes including return to zero (RZ), non-return to zero (NRZ), pulse position modulation (PPM) and others.

The second data transmission method, commonly referred to as carrier transmission, is implemented by modulating a frequency source with a serial data stream using established amplitude modulation (AM), frequency modulation (FM) or pulse modulation (PM) techniques and then using the modulated frequency source to control the power to an optical emitting device. There are advantages and disadvantages to either method of data transmission depending upon the objectives being sought for a particular data transmission system.

In an optical data transmission system, especially in an optical data transmission system dependent upon batteries as a source of power, it is desirable to achieve maximum useful operating distance or range with a minimum of power consumed or similarly achieve a defined range with minimum power consumption. Low average power operation can be achieved by using a baseband modulation scheme where the power to the optical emitting device is not applied most of the time during data transmission. This objective can be achieved by converting the input data to a serial data stream where the information is communicated via short pulses of light separated by relatively long periods of time.

To achieve the objective of low power operation, a PPM scheme where the input data is converted into short pulses and each pulse has a defined time relationship to some reference can be used. In this method the time relationship to the reference is used to communicate the information and the average relative time between each pulse is long. In such a PPM scheme a pulse is generated at a particular time within a relatively long but finite period of time referred to as a code symbol frame or code frame. The position of the pulse within this code frame is directly dependent upon the input data and in any particular PPM implementation there may be any number of positions within a code frame where a pulse may be positioned. In addition there may be one or several pulses allowed within each code frame. With such a PPM scheme and with randomly or nearly randomly varying input data, the actual time spacing between adjacent pulses varies significantly, since, by the rules of the conversion process, the input data may cause a pulse or pulses to occur in many different places within each code frame.

It is well known that a signal which is composed of a series of pulses which have widely varying time relationships to each other has many individual frequency components when analyzed in the frequency domain and these frequency components are spaced over a wide range of frequencies, i.e. the signal occupies a wide bandwidth. A system constructed this way is referred to as a wideband system. Currently popular optical data transmission systems use infrared light emitting and receiving transducers for several reasons including economic and convenience reasons. Specifically, infrared transducer devices are economical and the light used for transmission interferes little with human activities because it is invisible to humans. Such a wideband system for wireless optical data transmission and reception was proposed as a possible standard to the IEEE 802.11 Committee, in a paper titled Infrared Wireless Networks by Richard C. Allen, IEEE document #P802.11/91-33 in March of 1991.

Traditional fluorescent lighting systems have used the public utility AC power source to more or less directly operate one or more fluorescent lamps through the inductor and transformer action of a traditional ballast. This results in the production of light which flickers or varies in optical intensity at twice the rate of the incoming AC power source, once for each half-cycle of the incoming power. The typical AC power source in the United States has a frequency of 60 Hertz. Thus the fundamental frequency of the flickering or optical intensity variation of fluorescent lamps used in the U.S. is 120 Hertz.

In commercial structures, each lamp fixture typically includes several lamps and an array of lamp fixtures is used to provide general lighting coverage. Such fluorescent lighting systems have been quite popular in commercial environments and indeed are almost exclusively used. A main application for wireless optical data transmission systems is also in a commercial environment as part of a Local Area Network (LAN) system connecting multiple computers together, where such fluorescent lighting systems are used. In residential environments, fluorescent lighting has not been as popular but is growing in use with small lamp systems designed to replace tungsten filament bulbs rapidly gaining in popularity. However, wireless optical data transmission systems are not currently popular for most residential applications, with the major exception of entertainment and appliance remote controls.

In traditional fluorescent lighting systems there is a short period of time between each flicker of light from a fluorescent lamp when the lamp is not excited and is relatively dark. However, the lamp begins conduction and generates light quite rapidly when the voltage at each half cycle of the applied AC power has risen to the conduction threshold of the ionized gas within the lamp. The resulting optical intensity waveform from a fluorescent lamp is discontinuous and asymmetrical over each half cycle of applied AC power. Such a discontinuous and asymmetrical waveform will naturally have many frequency components when analyzed in the frequency domain. Since fluorescent lamps actually produce some amount of infrared light along with the intended visible light, fluorescent lighting systems emit both visible and infrared optical intensity signals that have frequency components or harmonics with significant amplitude anywhere from 10 to 30 times the 120 Hertz fundamental frequency of the lamp intensity variations. This intensity variation and the associated harmonics present a source of possible interference for any optical data transmission system using baseband modulation which generates and uses frequencies in this same range (120 Hertz to a few kilohertz). Additionally, operating an optical data transmission system using baseband modulation and infrared transducers will not eliminate the interference problem, because the fluorescent lighting systems also produce significant amounts of infrared light.

A wideband optical data transmission system, such as proposed in the paper written by Richard C. Allen referred to above, when operating at a peak data rate of 1 megabit per second, will generate strong infrared optical intensity component frequencies from approximately 60 kilohertz to 4 megahertz with additional weak components extending to the DC level at the low frequency end and near 10 megahertz at the high frequency end. A spectrographic plot of the optical intensity output spectrum from such a 1 megahertz system is shown in FIG. 1 which illustrates the output over the frequency range of 10 kilohertz to 10 megahertz. Not shown in the spectrographic plot of FIG. 1 is the DC component of the optical intensity signal which, due to the nature of PPM encoding discussed above can be a significant fraction of the total amplitude of the signal. Because some of the lower frequency components of the optical intensity signal are relatively weak, they can be eliminated by filtering without having a significant negative impact on the detection process. The DC and some of the low frequency components of the original optical intensity signal which may have been removed by this filtering, can be effectively replaced if the detection scheme includes some form of DC restoration circuitry. Such a detection scheme has been used in a one megabit per second optical data transmission system implemented as a LAN interface for desk top and portable computers by Photonics Corporation of San Jose, Calif.

Recently a new form of ballast for fluorescent lighting systems, commonly called an electronic ballast has been developed. These electronic ballasts are gaining in popularity for industrial and residential use because their operation is more efficient than traditional ballasts when powered from the prevalent public AC power sources. Electronic ballasts use technology, similar to DC switching power supply technology, to regenerate AC power at a much higher frequency than the incoming AC source. This higher frequency AC power is then used to operate the fluorescent lamps. These electronic ballasts operate fluorescent lamps at frequencies of 20 to 60 kilohertz instead of the traditional 120 Hertz. The power waveform into the fluorescent lamp using an electronic ballast is also discontinuous and asymmetric over each half cycle of operation. Therefore fluorescent lighting systems which use electronic ballasts also emit significant optical intensity frequency components beyond the fundamental operating frequency.

FIG. 2 illustrates the optical intensity waveform emitted by such an electronic ballast system and FIG. 3 shows a spectrographic plot over a frequency range of 30 kilohertz to 230 kilohertz for the same electronic ballast system as FIG. 2. Fortunately, due to the persistence of the phosphor in fluorescent lamps and other such effects, significant energy in frequency components of optical intensity with fluorescent lighting systems which use electronic ballasts extends from the fundamental operating frequency up to only the 3rd to 5th harmonic above the main operating frequency generated by the ballasts. The energy in each successively higher frequency component is significantly less than its predecessor as is indicated in FIG. 3. Even so, electronic ballast lighting systems such as these can pose a serious impediment to wideband as well as narrowband optical data transmission systems, as the fundamental operating frequency and harmonics can occupy a significant portion of the bandwidth of the data transmission system, thereby blocking communications.

In order to create successful communications using a wideband optical data transmission system in the presence of electronic ballast lighting, the interfering frequency components from the lighting system must be removed in a manner that allows proper detection of the transmitted signal. Some form of filtering, similar to the filtering discussed above which reduces interfering signals from traditional 120 Hertz fluorescent lighting systems, can be used to reduce the amplitude of interfering signals. However, components of the transmitted signal which are necessary for the detection process must not be significantly reduced or removed and, additionally, the relative amplitude and phase relationship of frequency components present in the detection process must be held within certain limits for proper detection to occur. Failure to keep the appropriate amplitude and phase relationship between components of the signal which are passed through the system to the detection process will result in effective interference between adjacent symbols of the transmitted signal, thereby scrambling the information and damaging the communication process. Unfortunately, many filtering schemes which could be used to remove unwanted fluorescent interference either remove needed signal components or substantially shift the phase of existing signal components in such a way as to cause interference between adjacent symbols of the transmitted signal.

SUMMARY OF THE INVENTION

Reduction of lower frequency interfering signals including signals from fluorescent light ballasts can be achieved by an optical receiving system, before the detection process, by differentiating the signal and then using a modified detection process to detect the differentiated signal. At least one data channel is included in the optical receiving system, each data channel including an optical receiving transducer which receives optical transmissions from an optical transmitter positioned some distance away from the optical receiving system, a differentiator, a gain set amplifier and a detector. The system can also optionally include a preamplifier, a gain control feedback circuit, a filter and a data output buffer. From the transducer, the received signal is differentiated and amplified to remove unwanted interfering signals from the received signal before it is transmitted to a detector. The detector converts the differentiated and amplified signal into an output data stream which corresponds to the signal transmitted by the optical transmitter and received by the optical receiving transducer.

DETAILED DESCRIPTION OF THE PREFERRED EMBODIMENTS

Figure 4:
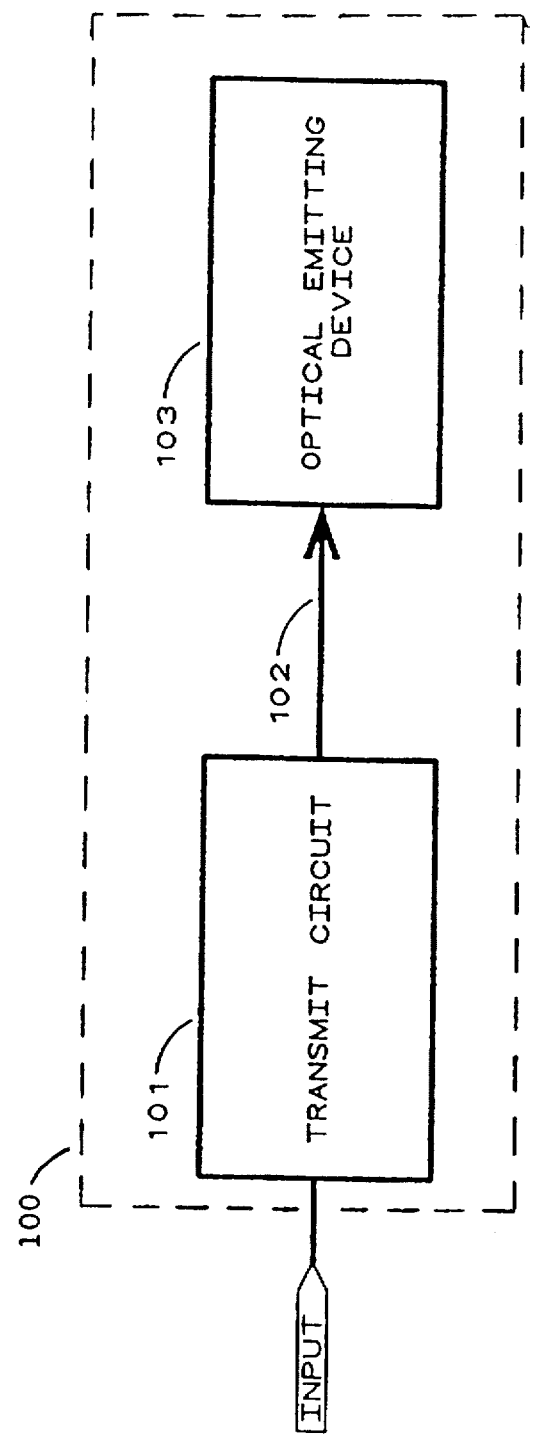
FIG. 4 illustrates a block diagram of one embodiment of a transmitter designed to generate a wideband optical intensity transmission signal.

FIG. 4 illustrates a block diagram of an optical data transmitter designed to generate a wideband optical intensity transmission signal. The optical data transmitter 100 of FIG. 4 includes a transmit circuit 101 which may include line receivers, pulse shapers, a power output stage and other circuitry which have the purpose of producing properly shaped power pulses and sending them to the optical emitting device 103 through the optical emitter control lines 102. The optical emitter control lines 102 may represent one or several electrical connections depending upon the actual optical emitting device 103 which is used. The optical emitting device 103 may be composed of a single light emitting diode (LED), an array of LEDs, a LASER, or some other such optical emitting device capable of emitting a light pulse of the correct shape and power.

Figure 5:
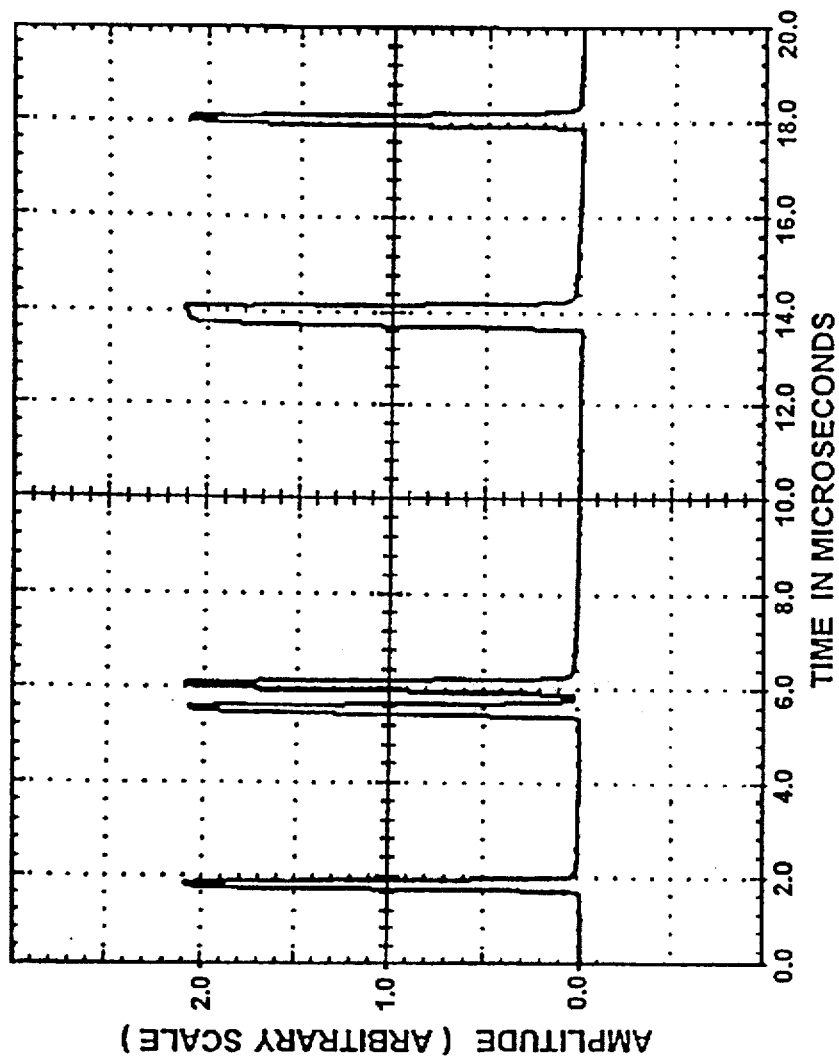
FIG. 5 illustrates a plot of intensity over time for one portion of time of the wideband optical transmitter output of the optical transmitter of FIG. 4.

FIG. 5 shows a plot of optical intensity over time for a portion of the output emissions of the optical data transmitter of FIG. 4. Note that FIG. 5 shows just a portion of the output of the transmitter and another such plot could possibly have a very different appearance. However any plot of optical intensity of such an optical data transmitter as illustrated in FIG. 4, when transmitting random data would exhibit the essential characteristics that 1) the pulse to pulse spacing would vary significantly and 2) the average density of pulses or duty cycle would be low as indicated by examination of FIG. 5.

Figure 1:
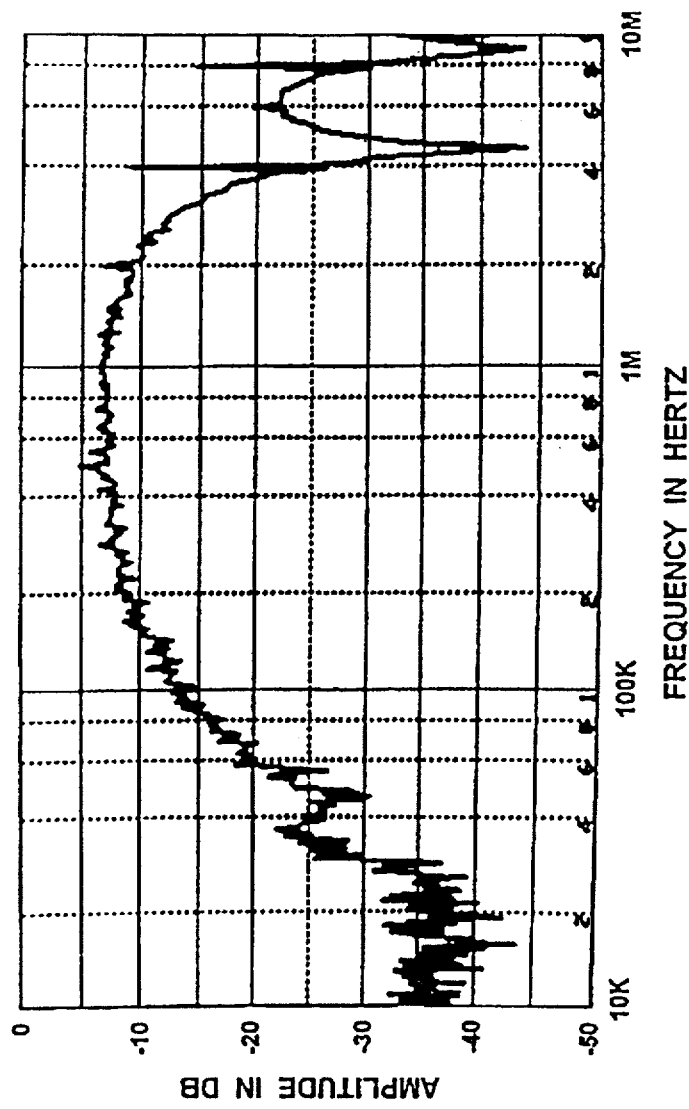
FIG. 1 illustrates a spectrographic plot showing the amplitude of frequency components of the transmitted optical intensity signal over a frequency range of 10 kilohertz to 10 megahertz of a wideband optical transmitter.

FIG. 1 shows a spectrographic plot of the amplitude of frequency components of optical intensity from 10 kilohertz to 10 megahertz emitted from the transmitter of FIG. 4. Note that the highest amplitude frequency components of FIG. 1 lie between the frequencies of approximately 60 kilohertz and 4 megahertz. A person skilled in the art will recognize that the transmitter of FIG. 4, the optical intensity over time plot of FIG. 5 and the spectrographic plot of FIG. 1 represent just some of many possible implementations of an optical data transmitting device which could be used in an optical data transmission system. The essential elements of the transmitter 100 are that it emits an optical intensity signal for data transmission and that this optical emission is wideband in nature, including many different component frequencies when observed in a spectrographic manner.

Figure 6:
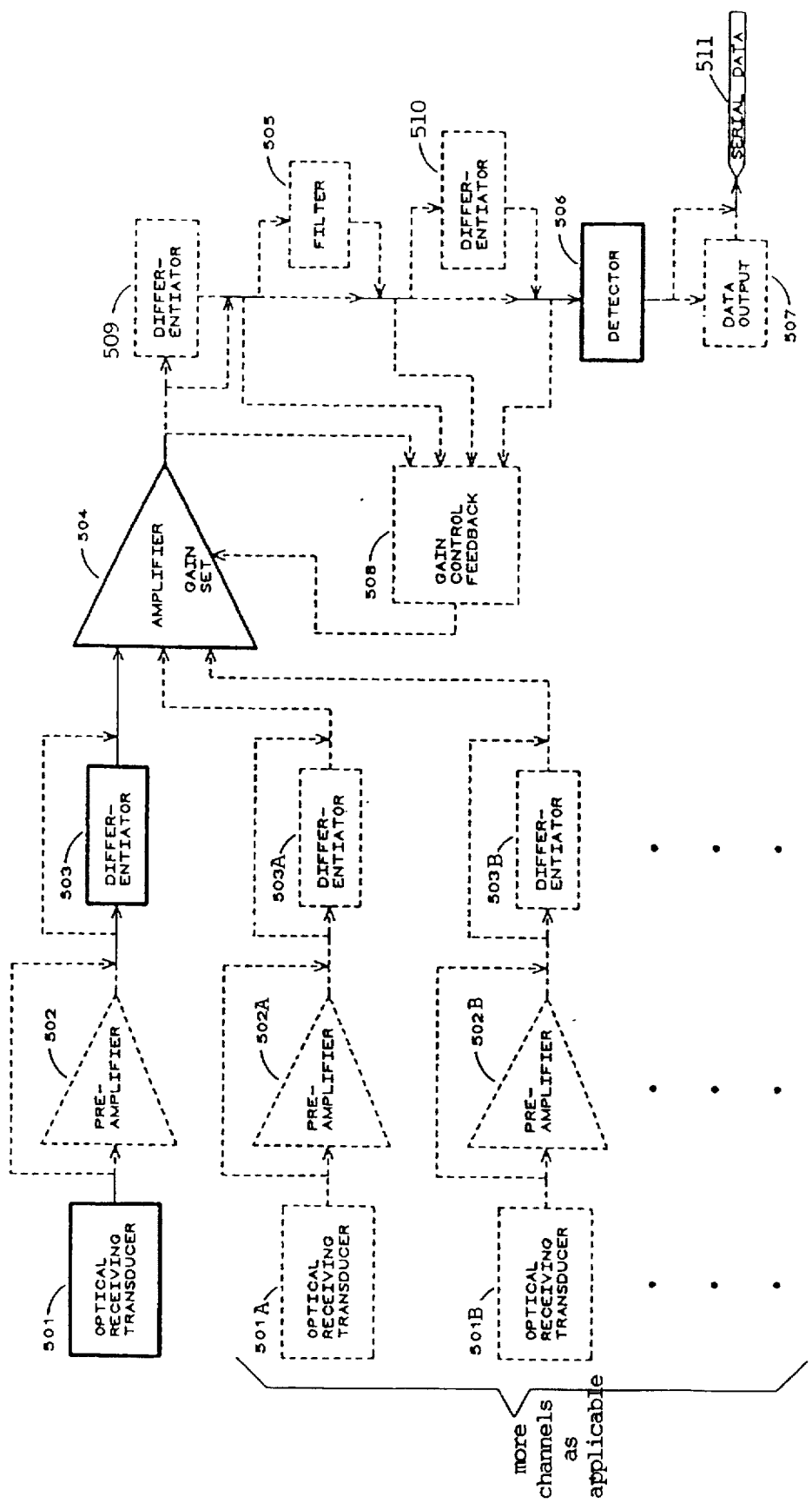
FIG. 6 illustrates a block diagram of one embodiment of an optical receiver designed to intercept and detect optical intensity signals such as would be transmitted by the optical transmitter of FIG. 4.

FIG. 6 illustrates a block diagram of an optical receiver designed to intercept and detect optical intensity signals such as would be transmitted by the optical transmitter of FIG. 4. The output of the optical receiving transducer 501 is coupled to the input of the differentiator 503. If a preamplifier 502 is included, the output of the optical receiving transducer 501 is coupled to the input of the pre-amplifier 502 and the output of the pre-amplifier 502 is coupled to the input of the differentiator 503. The output of the differentiator 503 is then coupled to the input of the amplifier 504. The output of the amplifier 504 is coupled to the input of the detector 506. If the differentiator 503 is not included before the amplifier 504, it can be included after the amplifier 504 so that the output of the amplifier 504 is coupled to the input of the differentiator 509 and the output of the differentiator 509 is coupled to the input of the detector. If the filter 505 is included it can be inserted between the amplifier 504 and the detector 506, between the differentiator 509 and the detector 506, or between the amplifier 504 and the differentiator 510. Different reference numerals are used for the differentiator 503, 509 or 510 to indicate the different places within the circuit that the differentiator can be coupled. The differentiator to be used performs the same function no matter where it is placed within the circuit and only one differentiator location 503, 509 or 510 is required in the optical receiver of the present invention. If the differentiator is located at the location 503, there will be one differentiator circuit for each channel.

If an electronically adjustable amplifier 504 is used, a gain control feedback circuit 508 can be coupled between the output of the amplifier 504 and the gain set input of the amplifier 504. If the differentiator 509 or 510 is included after the amplifier or the filter 505 is included, the output of either one of those elements can be coupled to the input of the gain control feedback circuit 508. The output of the detector 506 is coupled to the serial data output node 511 of the optical receiver. A data output circuit 507 can be coupled between the output of the detector 506 and the serial data output node 511 of the optical receiver for optionally converting inverted data from the detector 506 into non-inverted data for output to other circuits or for driving a wire or transmission line.

If more than one channel is applicable for the optical receiver of FIG. 6, additional channels can be included such that each channel includes an optical receiving transducer 501X, a preamplifier 502X, and possibly a differentiator 503X coupled as inputs of the amplifier 504. Two additional channels are shown each including an optical receiving transducer 501A, 501B, a preamplifier 502A, 502B and possibly a differentiator 503A, 503B and are coupled as inputs of the amplifier 504.

Optical intensity emissions from the transmitter of FIG. 4 or a similar such device are intercepted by the optical receiving transducer 501 and converted into voltage or current signals by the action of the transducer 501. In many cases, especially when the transmission system is operated near its maximum range, the optical intensity falling upon the transducer 501 is quite low and the resulting voltage or current generated by the transducer 501 is also quite low, in which case the preamplifier 502 may optionally be included to boost the voltage or current amplitude of the signal to a level which can more easily be accommodated by the remaining circuitry in the optical receiver of the present invention. From the optional preamplifier 502 the signal may be passed into the optionally located differentiator 503 whereupon the signal is transformed by the mathematical differentiation process into a signal which has a much lower content of lower frequency components and no DC component at all.

Figure 7:
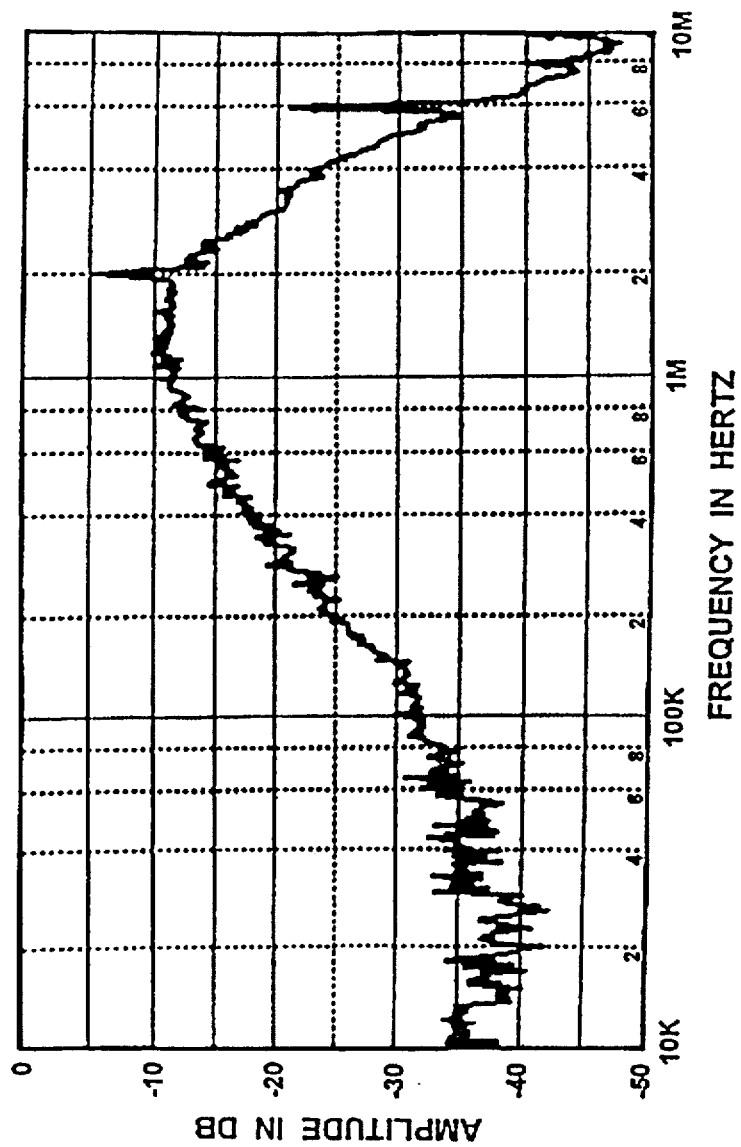
FIG. 7 illustrates a spectrographic plot showing the amplitude of frequency components over a frequency range of 10 kilohertz to 10 megahertz of the output of the differentiator portion of the optical receiver of FIG. 6.

FIG. 7 shows a spectrographic plot of the output of the differentiator 503 over the frequency range of 10 kilohertz to 10 megahertz. Upon comparison of FIG. 1 with FIG. 7 it will be apparent that the relative amplitude of the lower frequency components of the original signal have greatly diminished as a result of the differentiation process. Differentiation of a complex signal results in a new complex signal wherein a particular frequency component's amplitude is changed from it's original undifferentiated amplitude in direct proportion to it's frequency, while keeping a linear phase relationship between all the frequency components of the complex signal. Thus, all of the frequency components which are passed through to the detector will have appropriate amplitude and phase relationships to each other and the signal detection will be free of interference between adjacent symbols of the transmitted signal.

Figure 2:
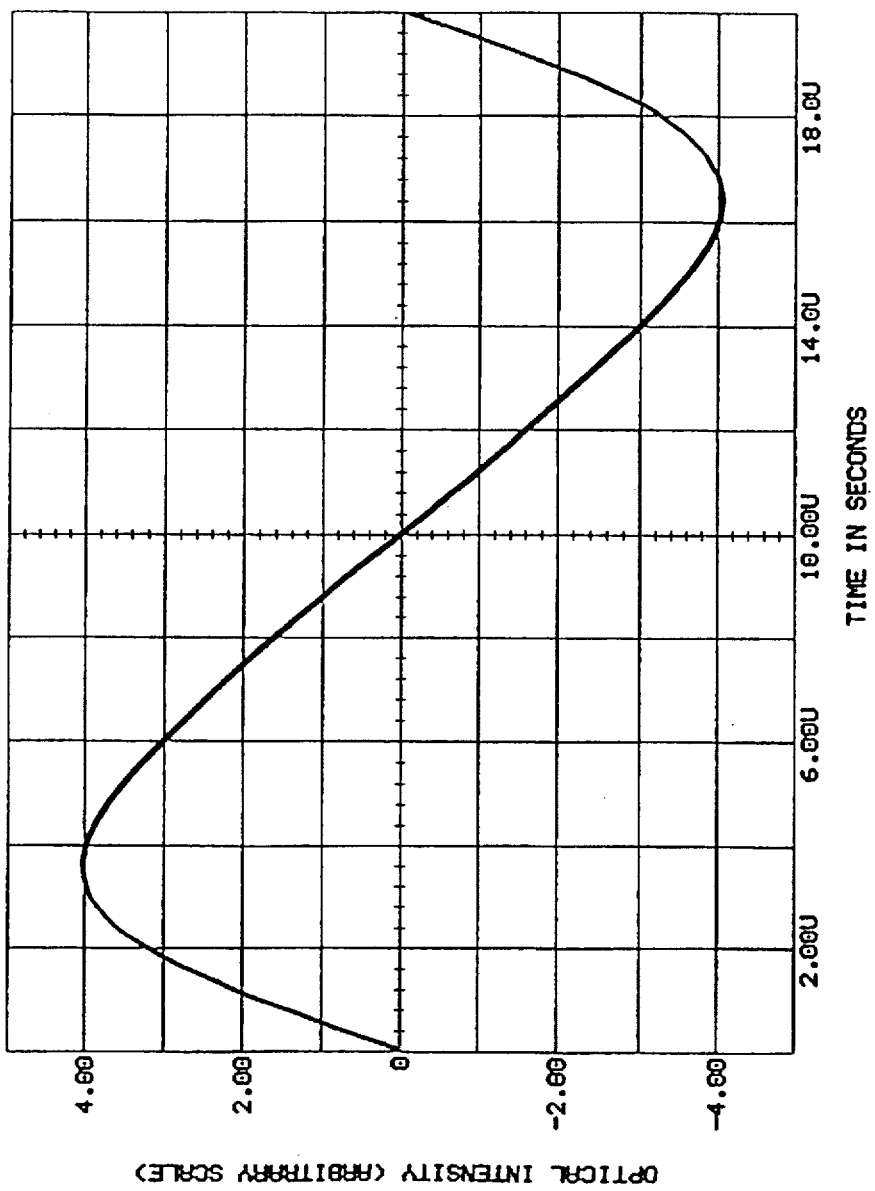
FIG. 2 illustrates a plot of intensity over time of the emitted light intensity (optical output) of an electronic ballast fluorescent lighting system.
Figure 3:
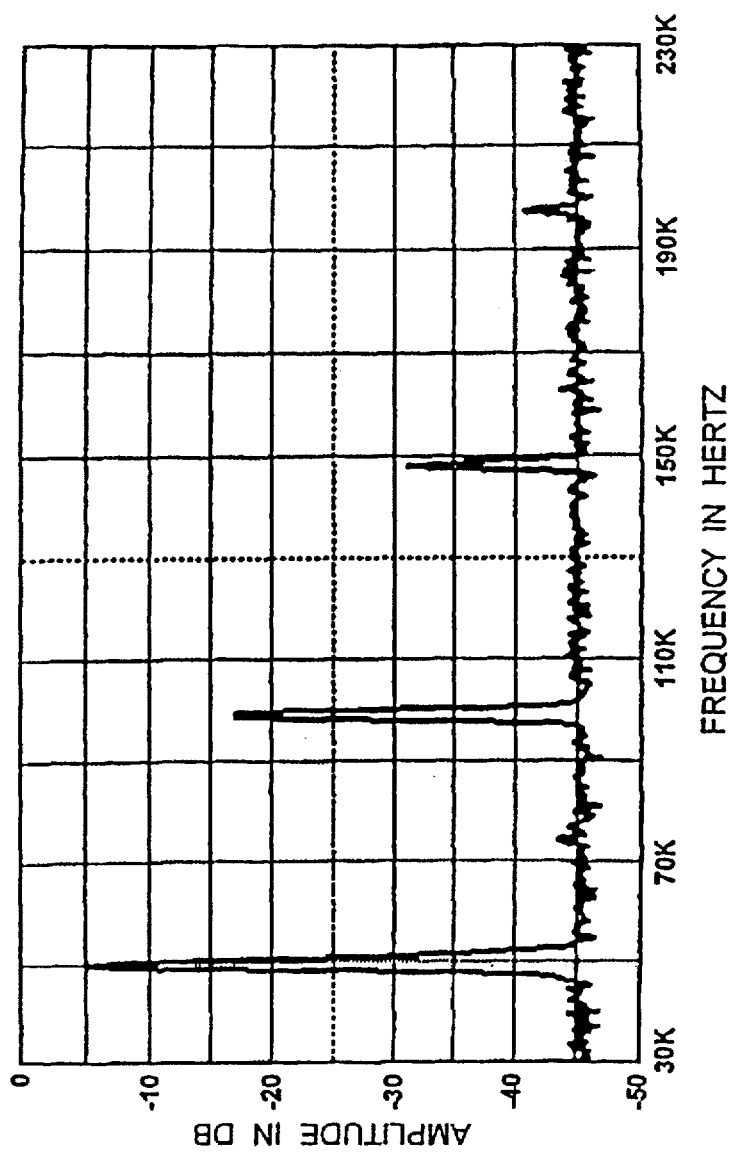
FIG. 3 illustrates a spectrographic plot of optical intensity frequency components of the output of electronic ballast fluorescent lighting system.
Figure 8:
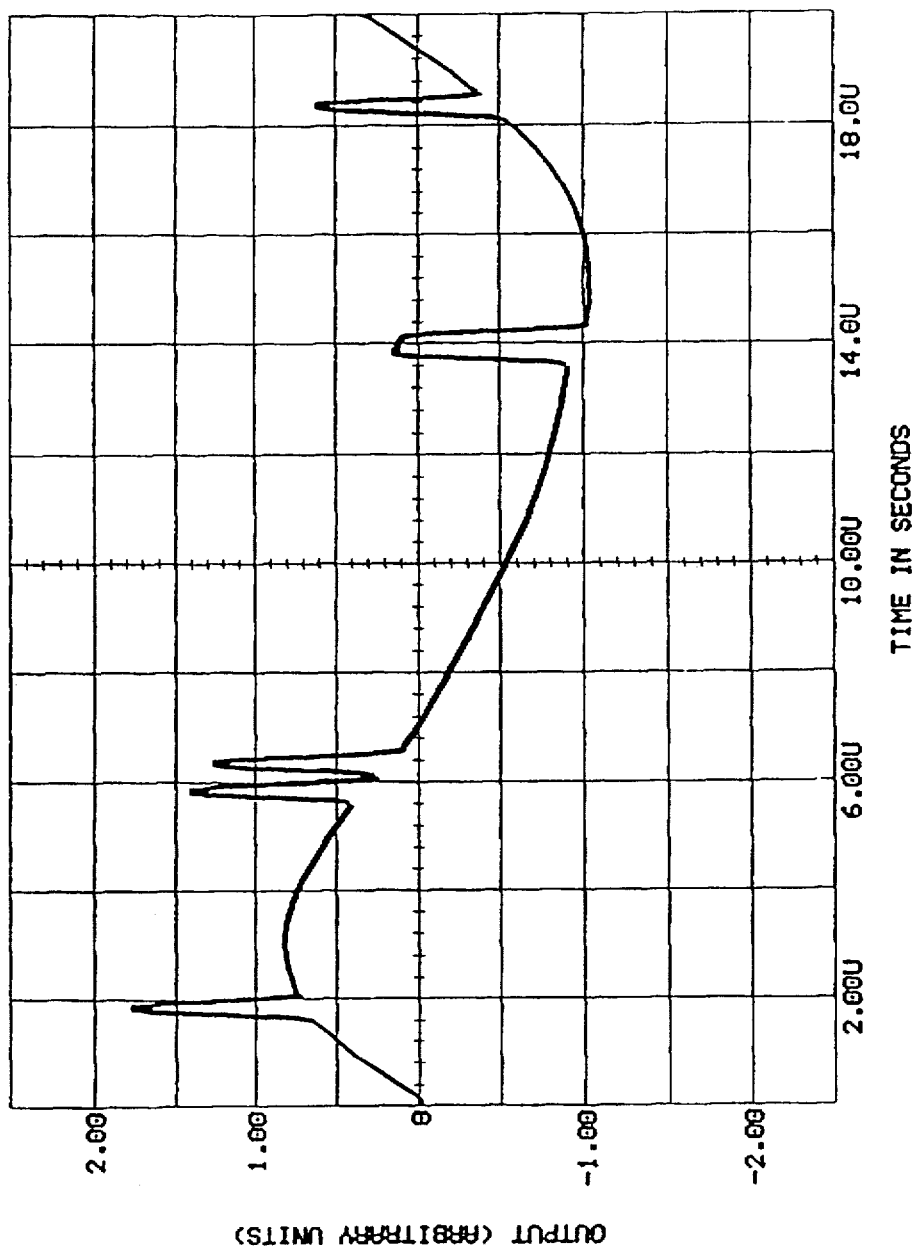
FIG. 8 illustrates a plot of amplitude over time at the preamplifier output of the optical receiver of FIG. 6 when it is simultaneously exposed to a wideband optical data transmission signal and an interfering electronic ballast lighting signal.
Figure 9:
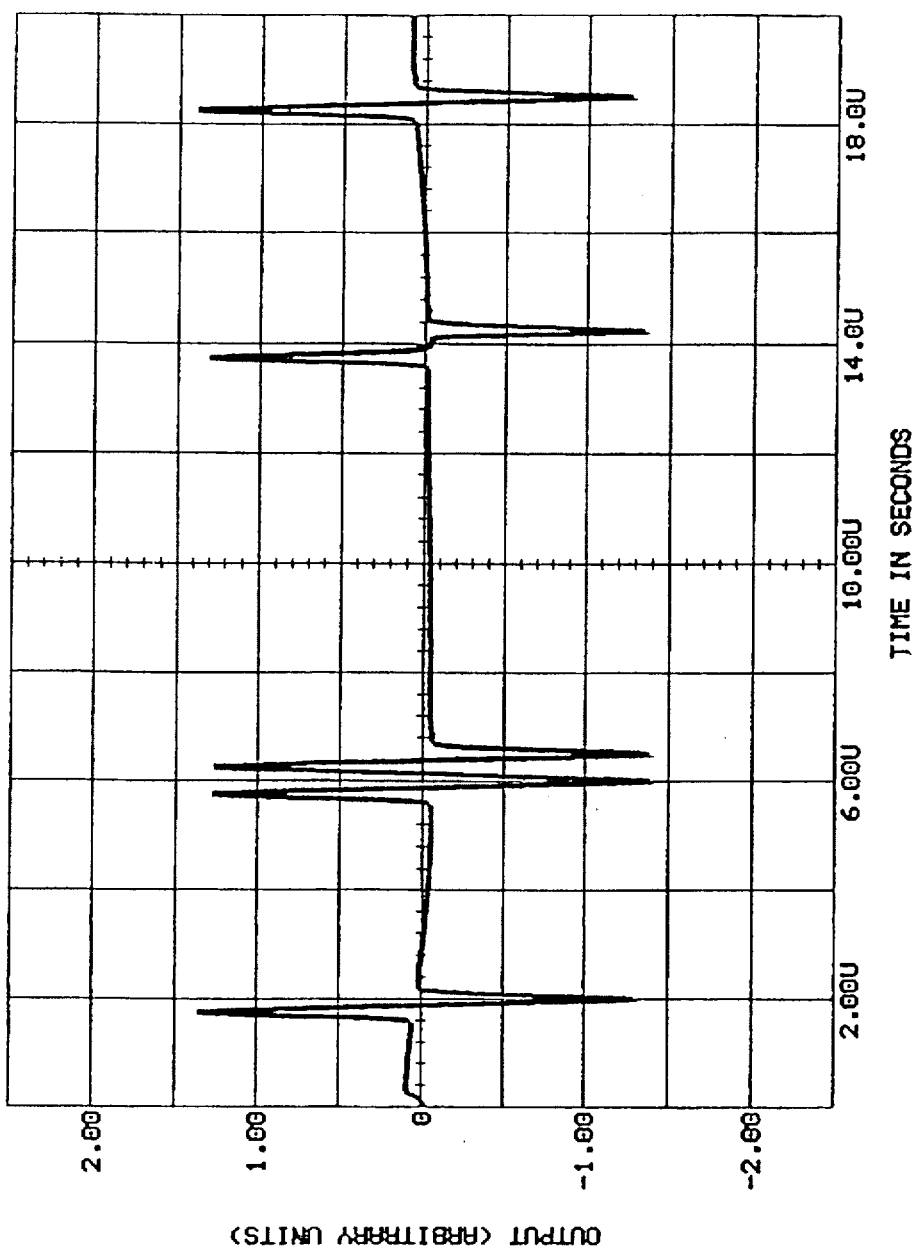
FIG. 9 illustrates a plot of amplitude over time at a point just before the detection process of the wideband optical receiver of FIG. 6 when it is simultaneously exposed to a wideband optical data transmission signal and interfering electronic ballast lighting signal.

FIG. 8 shows the output signal over time of the optical receiving transducer 501 or the optional preamplifier 502 when the optical receiver is exposed to an optical data transmission signal and is also exposed to light from an electronic ballast fluorescent lighting system. Note that the optical data transmission signal is superimposed on a large amplitude lower frequency waveform. This lower frequency waveform is from the electronic ballast lighting system and is a similar waveform to that shown in FIG. 2. FIG. 9 shows the same signal as FIG. 8 after it has passed through the differentiator 503, 509 or 510. Note that the amplitude of the lower frequency signal due to the electronic ballast lighting system has greatly diminished while the higher frequency signal from the optical transmitter has increased in amplitude and has changed in form from a unipolar signal, where the pulses extend from the baseline in only one direction, to a bipolar signal, where the pulses extend from the baseline in both directions.

The amplifier 504 may be a fixed gain amplifier or may also be an electronically adjustable gain amplifier. The amplifier 504 may also have several inputs and act as a summation amplifier for a plurality of sets of the transducers 501, the optional preamplifiers 502 and the optional differentiators 503. One or more of the inputs of the amplifier 504 may also be configured as an inverting or differencing input so as to allow the signal from one or more sets of the receiving transducers 501, the optional preamplifiers 502 and the optional differentiators 503 to be subtracted from the signal from other such sets. The amplifier 504 may be followed by an optionally located differentiator 509 if the differentiator 503 is not already located before the amplifier 504. If the differentiator 509 is included after the amplifier 504 the operation of the differentiator 509 is the same as when it was located before the amplifier 504, except that it would operate upon a possibly larger amplitude signal due to the operation of the amplifier 504.

If the optional differentiator 509 is placed after the amplifier 504, it may in turn be followed by the optional filter 505. The optional filter 505 performs the function of removing frequency components above and possibly below the main frequency range of the optical data transmission signal in order to improve the overall signal to noise ratio of the signal before the detection process, thereby improving the bit error rate. In the simplest implementation of a wideband optical data transmission system, the filter 505 is not necessary.

The output of the optional filter 505 can be followed by the optionally located differentiator 510 if the differentiator 503 is not located before the amplifier 504 and if the differentiator 509 is not located before the optional filter 505. In fact, it can be shown that the relative order of the differentiator 503, 508 or 509, the amplifier 504 and the filter 505 can be interchanged without changing the essential function of the receiving system. In any particular embodiment of the optical receiver as illustrated in FIG. 6, the differentiator 503, 508 or 509, the amplifier 504, and the filter 505 may be arranged in any order. The preferred embodiment of the optical receiver as illustrated in FIG. 6, includes the differentiator 503 before the amplifier 504 and the filter 505.

An electronically adjustable gain amplifier can be used for the amplifier 504. If an electronically adjustable gain amplifier is used, it's gain adjustment may be coupled to the output of the optional gain control feedback circuit 508 which, in turn, has it's input connected to the output of the amplifier 504 or to the output of a later stage depending on the configuration of the receiving system, so as to establish an automatic gain control (AGC) loop. This AGC loop serves to regulate the amplitude of the received optical signal in order to compensate for variations in the strength of the received signal due to changes in the distance between the transmitter and the receiver or due to changes in the optical propagation characteristics of the environment such as surface reflectivity and distance to the surfaces inside the environment in which the optical data transmission is taking place.

After the optional filter 505 and after the optionally located differentiator 509 or 510, the amplified and transformed optical signal is transmitted to the detector 506. The detector 506 serves to convert the analog optical data transmission signal as received, amplified and differentiated, back into a digital serial data stream representing the same serial data, or possibly an inverted version of the same serial data, as was input to the transmitter of FIG. 4 or a similar such transmitter. The optional data output circuit 507 can be included and serves to boost the digital serial data stream from the detector 506 to enable the serial data stream to be sent through a long wire or transmission line to the receiving device(s) which make use of the transmitted data. The optional data output circuit 507 may also serve the function of converting inverted data from the detector 506 into non-inverted or normal data if inverted data is not preferred for presentation to the wire or transmission line. By this transmitting and receiving process, data transmission is established between the transmitter and receiver by means of pulses of light even in the presence of interfering signals from an electronic ballast lighting system or other interfering source.

Figure 10:
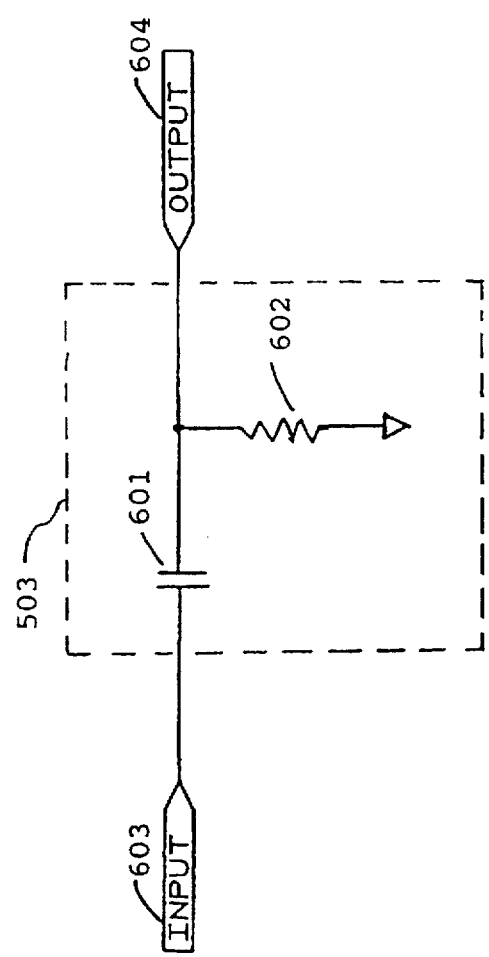
FIG. 10 illustrates a circuit diagram of the preferred embodiment of the differentiator portion of the optical receiver of FIG. 6.

FIG. 10 illustrates a circuit diagram of the preferred embodiment of a differentiator circuit which can be used as the differentiator 503, 509 or 510. The differentiator circuit illustrated in FIG. 10 includes a capacitor 601 and a resistor 602. A first terminal of the capacitor 601 is coupled to the input node 603. A second terminal of the capacitor 601 is coupled to a first terminal of the resistor 602 and to the output node 604. A second terminal of the resistor 602 is coupled to ground.

When the signal connected to the input node 603 of the differentiator 503 is sent from a circuit having a low impedance output, such as from a preamplifier 502 or a transducer 501 and when the circuit output node 604 of the differentiator is connected to a high impedance input of a circuit such as the amplifier 504 or the filter 505, then the capacitor will act as a differentiation element. The frequency range over which the differentiator performs true mathematical differentiation need only correspond to the frequency range over which there are significant frequency components of the received optical signal which are important to the detection process. Frequencies higher than the upper limit of significant frequency components of the optical signal are de-emphasized by reducing the differentiation action at high frequencies by choosing an optimal value for the resistor 602. In the preferred embodiment, a 39 pf capacitor and a 1.15 K$\Omega$ resistor are used for a 1M-bit system with approximately 3MHz of band width. It will be apparent to engineers of ordinary skill in the art that other values of components can readily be used to vary the specifications desired as to performance, expense or manufacturability.

Figure 11:
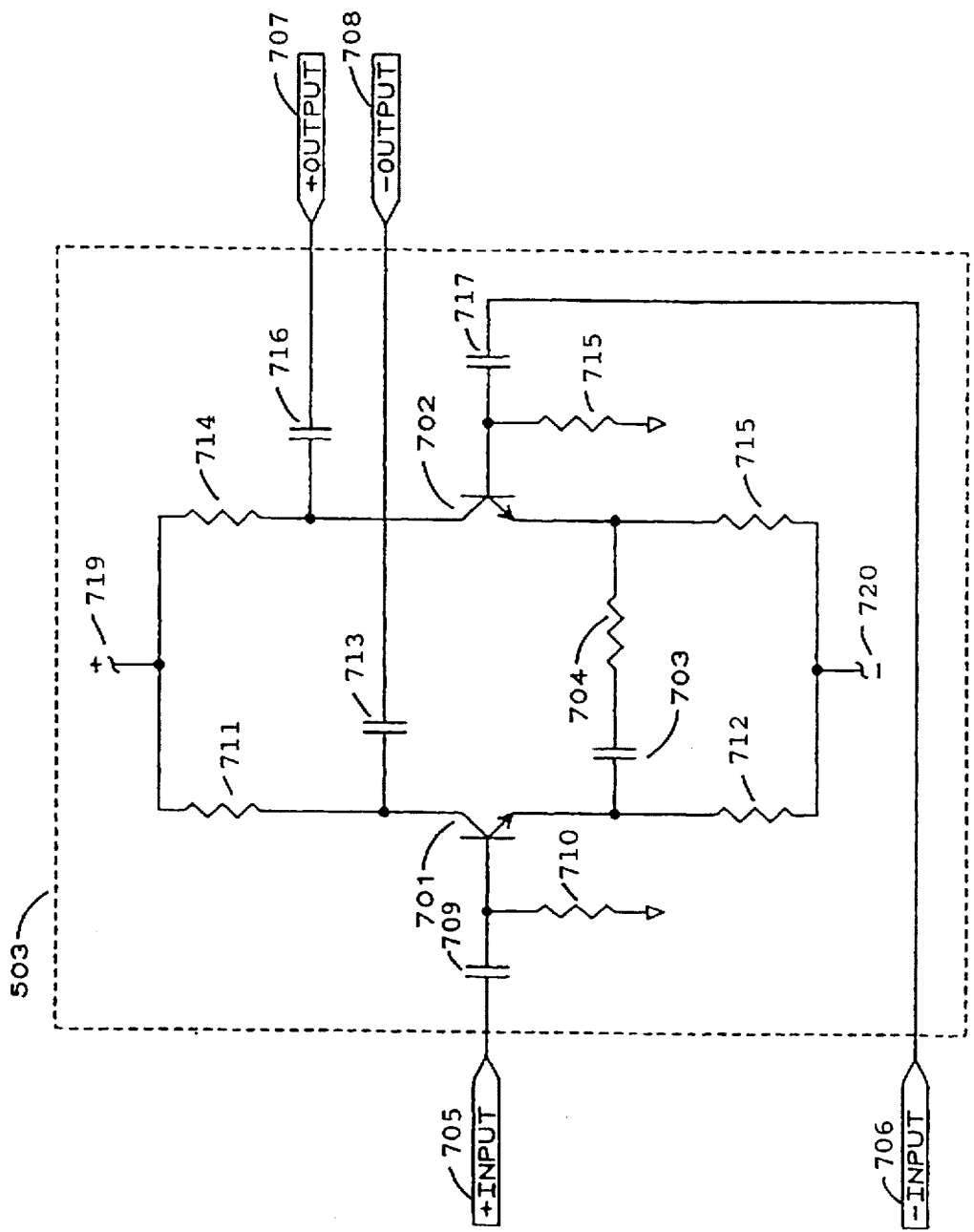
FIG. 11 illustrates a circuit diagram of an alternate embodiment of the differentiator portion of the optical receiver of FIG. 6.

FIG. 11 illustrates an alternate embodiment of a differentiator circuit which can be used as the differentiator 503, 509 or 510. This embodiment of the differentiator includes a differential input including the input nodes 705 and 706 and a differential output including the output nodes 707 and 708. The positive input node 705 is coupled to a first terminal of the capacitor 709. A second terminal of the capacitor 709 is coupled to a first terminal of the resistor 710 and to the base of the transistor 701. A second terminal of the resistor 710 is coupled to ground. The collector of the transistor 701 is coupled to a first terminal of the resistor 711 and to a first terminal of the capacitor 713. The emitter of the transistor 701 is coupled to a first terminal of the resistor 712 and to a first terminal of the capacitor 703. A second terminal of the capacitor 703 is coupled to a first terminal of the resistor 704.

The negative input node 706 is coupled to a first terminal of the capacitor 717. A second terminal of the capacitor 717 is coupled to a first terminal of the resistor 718 and to the base of the transistor 702. A second terminal of the resistor 718 is coupled to ground. The collector of the transistor 702 is coupled to a first terminal of the resistor 714 and to a first terminal of the capacitor 716. The second terminal of the resistor 714 and the second terminal of the resistor 711 are coupled to the positive power supply 719. The emitter of the transistor 702 is coupled to a second terminal of the resistor 704 and a first terminal of the resistor 715. A second terminal of the resistor 712 and a second terminal of the resistor 715 are coupled to the negative power supply 720. A second terminal of the capacitor 716 is coupled to the positive output node 707. A second terminal of the capacitor 713 is coupled to the negative output node 708.

The differentiator response from the differentiator circuit of FIG. 11 is obtained by the use of selective degeneration of the differential amplifier transistor pair 701 and 702 by means of the capacitor 703 and the resistor 704. The proper choice of values for the capacitor 703, the resistor 704, the transistors 701 and 702 and the other components in the circuit produces a differentiator which performs the differentiation process over the appropriate range of frequencies for correct operation of a wideband optical receiver.

Regardless of the presence of the optional preamplifier(s) 502 and the order of the amplifier 504, the differentiator 503, 509 or 510 and the optional filter 505 in the optical receiver as illustrated in FIG. 6, the optical data transmission signal received by the optical receiving transducer(s) 501 is amplified, filtered and differentiated and thereby transformed from a weak unipolar signal with possibly significant amounts of noise into a much larger amplitude bipolar signal with low frequency noise, including such noise as may come from electronic ballast lighting systems greatly reduced by the time it reaches the detector 506.

Figure 12:
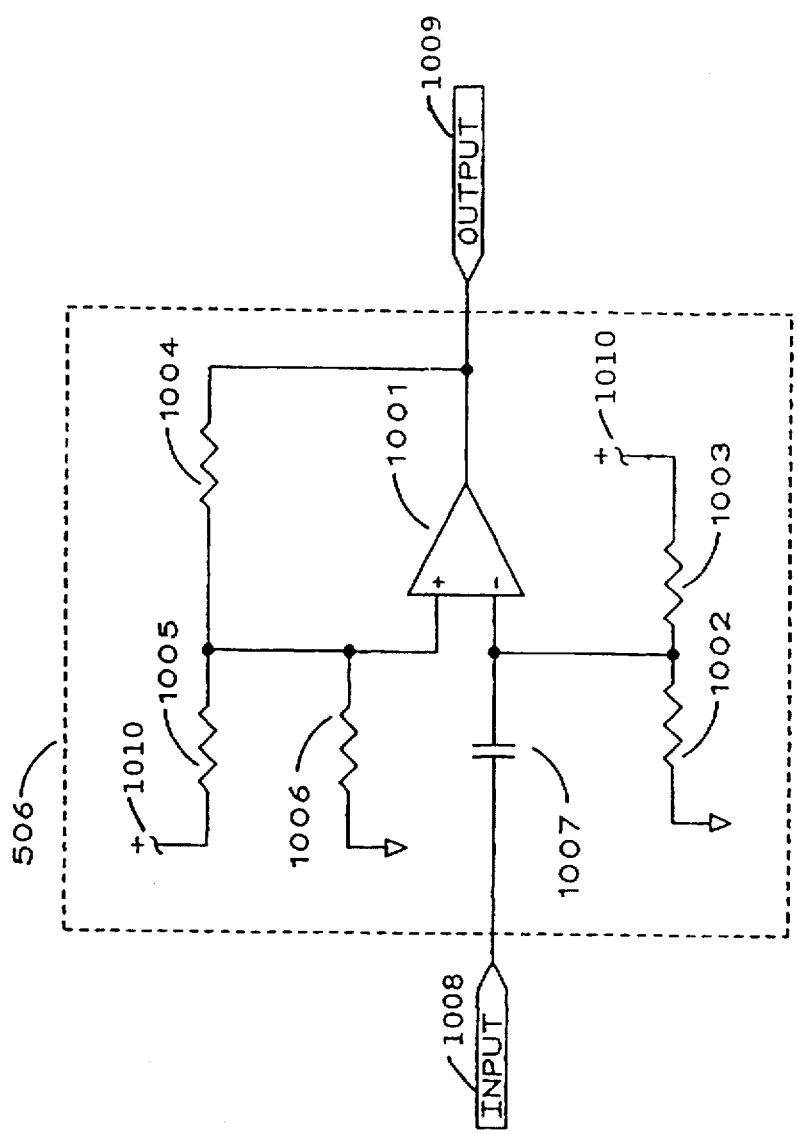
FIG. 12 illustrates a circuit diagram of one embodiment of the detector portion of the optical receiver of FIG. 6.

FIG. 12 illustrates an embodiment of a detector which can be used as the detector 506 in the optical receiver circuit of FIG. 6. The input node 1008 is coupled to a first terminal of the capacitor 1007. A second terminal of the capacitor 1007 is coupled to the negative input of the comparator 1001, to a first terminal of the resistor 1002 and a first terminal of the resistor 1003. A second terminal of the resistor 1002 is coupled to ground. A second terminal of the resistor 1003 is coupled to the positive power supply 1010. The positive input of the comparator 1001 is coupled to a first terminal of the resistor 1006, a first terminal of the resistor 1005 and a first terminal of the resistor 1004. A second terminal of the resistor 1005 is coupled to the positive power supply 1010. A second terminal of the resistor 1004 is coupled to the output of the comparator 1001 and the output node 1009. A second terminal of the resistor 1006 is coupled to ground.

The bipolar signal input to the detector 506 from the amplification, filtering and differentiation is conducted from the input node 1008 through the capacitor 1007 into the inverting input of the comparator 1001. The resistors 1002 and 1003 set the DC bias at the negative input of the comparator 1001 for proper operation of the comparator 1001. The resistors 1004, 1005 and 1006 create a positive feedback network that establishes a different threshold for each half cycle of the bipolar signal received. Assuming that a first quiescent state of the comparator circuit is such that it's output is at a high voltage level then, due to the positive feedback network of the resistors 1004, 1005 and 1006, the positive input of the comparator 1001 will be set to a high threshold level. When the first positive half of the bipolar signal appears at the negative input of the comparator 1001 and when this signal voltage increases until it crosses the high threshold level, then the output of the comparator 1001 will change to a low voltage level and the positive feedback network will cause the positive input of the comparator 1001 to be set to a low threshold level. The output of the comparator 1001 will then remain at a low voltage level until the second negative half of the bipolar signal crosses the low threshold level at which time the output of the comparator 1001 will switch to a high voltage level again. In this way the combination of a first positive half and a second negative half of the bipolar signal will cause the output of the comparator 1001 to switch from a high voltage level to a low voltage level and then to a high voltage level again, which will result in the creation of an inverted version of the original serial data stream which was transmitted from the optical transmitter 100 or a similar such device.

Figure 13:
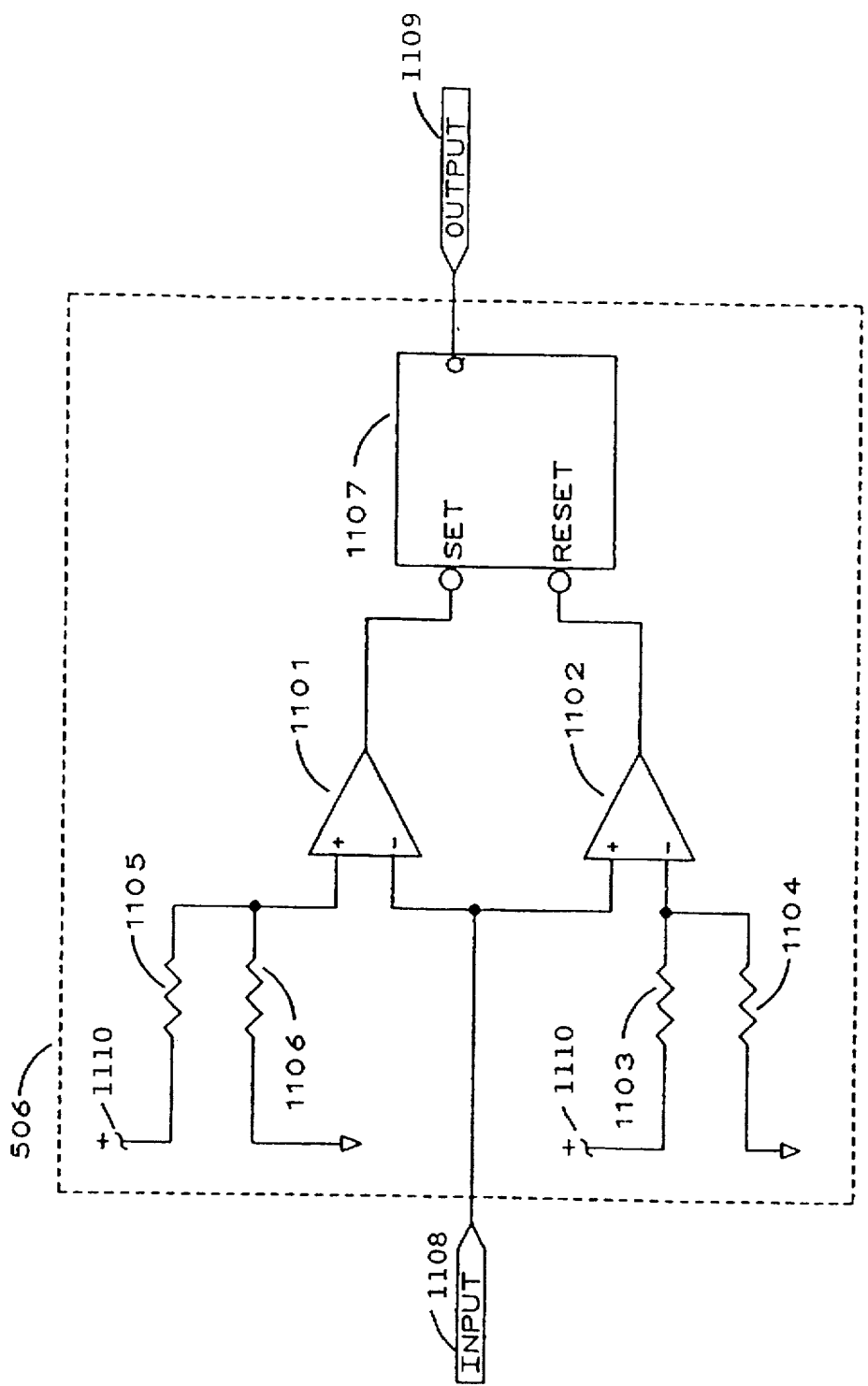
FIG. 13 illustrates an alternate embodiment of the detector portion of the optical receiver of FIG. 6.

FIG. 13 illustrates another embodiment of a detector which can be used as the detector 506 in the optical receiver circuit of FIG. 6. In this case, the two comparators 1101 and 1102 are used. The input node 1108 is coupled to the negative input of the comparator 1101 and the positive input of the comparator 1102. The positive input of the comparator 1101 is coupled to a first terminal of the resistor 1105 and a first terminal of the resistor 1106. A second terminal of the resistor 1105 is coupled to the positive power supply 1110. A second terminal of the resistor 1106 is coupled to ground. The negative input of the comparator 1102 is coupled to a first terminal of the resistor 1103 and to a first terminal of the resistor 1104. A second terminal of the resistor 1103 is coupled to the positive power supply 1110. A second terminal of the resistor 1104 is coupled to ground. The output of the comparator 1101 is coupled to the active-low set input of the SR flip-flop 1107. The output of the comparator 1102 is coupled to the active-low reset input of the SR flip-flop 1107. The output Q of the SR flip-flop 1107 is coupled to the output node 1109 of the detector.

The bipolar signal from the amplification, filtering and differentiation is conducted from the input node 1108 to the negative input of the comparator 1101 and to the positive input of the comparator 1102. If a first quiescent state of the circuit is such that the Q output of the SR flip-flop 1107 is at a logical high voltage level, i.e. the flip-flop is in the "set" state, when the first positive half of the bipolar signal appears at the positive input of the comparator 1102 and the signal voltage of the positive input of the comparator 1102 increases until it crosses a high threshold level set by the resistors 1103 and 1104, then the output of the comparator 1102 will switch to a logical low voltage level and will activate the reset condition of the SR flip-flop 1107 causing the output Q of the SR flip-flop 1107 to switch to a logical low voltage level. When the second negative half of the bipolar signal then appears at the negative input of the comparator 1101, and when this signal voltage decreases until it crosses a low threshold level set by the resistors 1105 and 1106, the output of the comparator 1101 will switch to a logical low voltage level, thereby activating the set condition of the SR flip-flop 1107, causing the output Q of the flip-flop to return to a logical high voltage level. In this way the combination of a first positive half and a second negative half of the bipolar signal will cause the output of the SR flop-flop 1107 to switch from a logical high voltage level to a logical low voltage level then to a logical high voltage level again which will result in the creation of an inverted version of the original serial data stream which was transmitted from the optical transmitter 100 or a similar such device.

Figure 14:
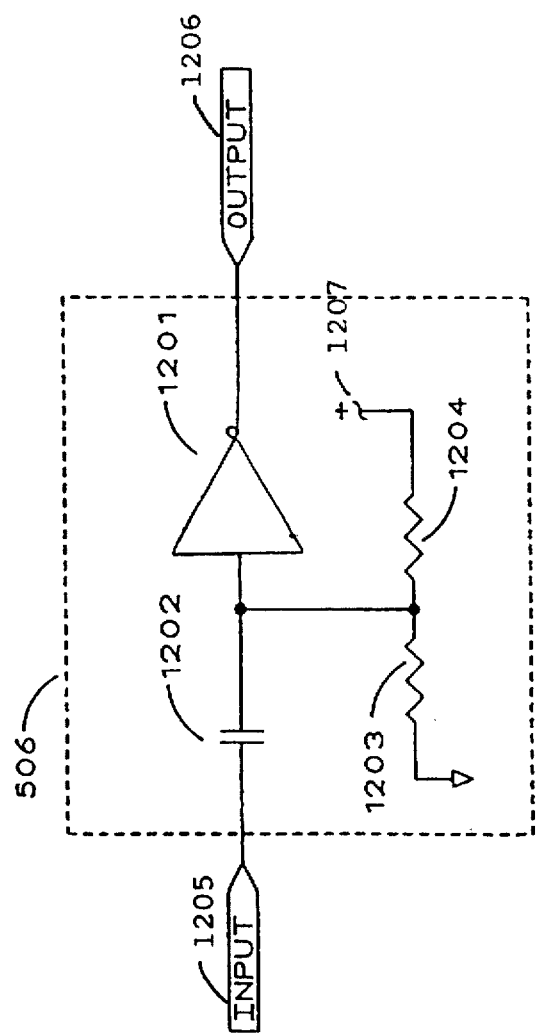
FIG. 14 illustrates another alternate embodiment of the detector portion of the optical receiver of FIG. 6.

FIG. 14 illustrates another embodiment of a detector which can be used as the detector 506 in the optical receiver circuit of FIG. 6. The input node 1205 is coupled to a first terminal of the capacitor 1202. A second terminal of the capacitor 1202 is coupled to the input of the logic device 1201, to a first terminal of the resistor 1203 and to a first terminal of the resistor 1204. A second terminal of the resistor 1203 is coupled to ground. A second terminal of the resistor 1204 is coupled to the positive power supply 1207. The active low output of the logic device 1201 is coupled to the output node 1206 of the detector.

The logic device 1201 is a logic device with a hysteresis characteristic built into the design of the logic device, which means it has separate thresholds for rising and falling signals. Such a logic device may be one section of a part number 74AC14, available from Motorola Inc. or National Semiconductor Inc., or it may be one of many other similar devices available from a number of different manufacturers. If the amplitude of the bipolar signal presented to the input of the detector is adjusted by the design of the preceding stages, to be in the correct range in relation to the built-in hysteresis of the logic device 1201, then the output of the logic device 1201 will fall to a logical low voltage level when the bipolar signal rises above the internal positive threshold of the logic device and the output of the logic device 1201 will rise to a logical high voltage level when the bipolar signal drops below the internal negative threshold of the logic device 1201. In this manner, the combination of a first positive half and a second negative half of the bipolar signal will cause the output of the logic device 1201 to switch from a logical high voltage level to a logical low voltage level then to a logical high voltage level again which will result in the creation of an inverted version of the original serial data stream which was transmitted from the optical transmitter 100 or a similar such device.

Figure 15:
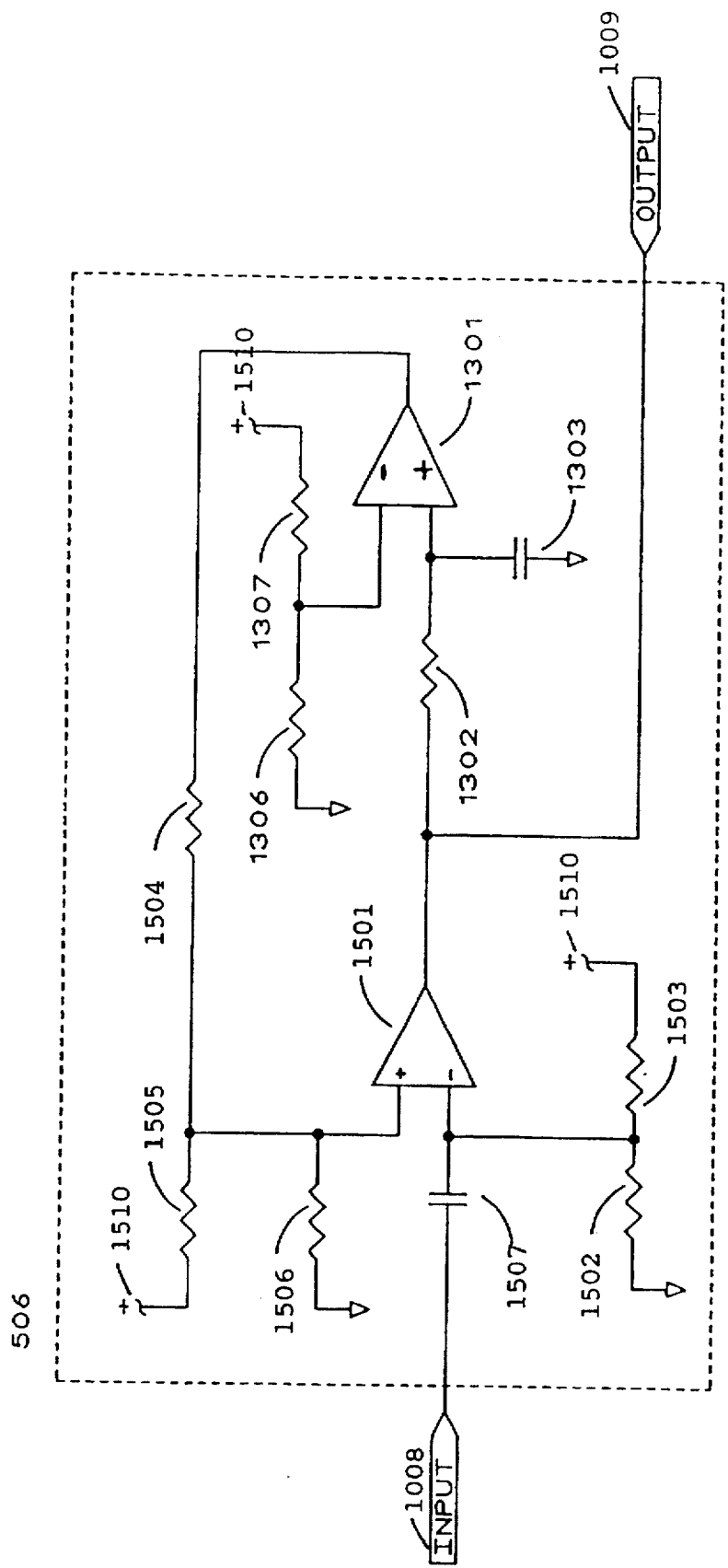
FIG. 15 illustrates the preferred embodiment of the detector portion of the optical receiver of FIG. 6.

The preferred embodiment of a detector 506 which can be used as the detector in the optical receiver circuit of FIG. 6 is illustrated in FIG. 15. The preferred detector illustrated in FIG. 15 uses a scheme similar to the detector of FIG. 12 except that another comparator and its accompanying circuitry is inserted between the output of the comparator 1501 and the positive feedback network of the resistors 1504, 1505 and 1506. The input node 1008 is coupled to a first terminal of the capacitor 1507. A second terminal of the capacitor 1507 is coupled to the negative input of the comparator 1501, to a first terminal of the resistor 1502 and to a first terminal of the resistor 1503. A second terminal of the resistor 1502 is coupled to ground. A second terminal of the resistor 1503 is coupled to the positive power supply 1510. The positive input of the comparator 1501 is coupled to a first terminal of the resistor 1506, a first terminal of the resistor 1505 and a first terminal of the resistor 1504. A second terminal of the resistor 1506 is coupled to ground. A second terminal of the resistor 1505 is coupled to the positive power supply 1510.

The output of the comparator 1501 is coupled to a first terminal of the resistor 1302 and to the output node 1009. A second terminal of the resistor 1302 is coupled to the positive input of the comparator 1301 and to a first terminal of the capacitor 1303. A second terminal of the capacitor 1303 is coupled to ground. The negative input of the comparator 1301 is coupled to a first terminal of the resistor 1306 and a first terminal of the resistor 1307. A second terminal of the resistor 1306 is coupled to ground. A second terminal of the resistor 1307 is coupled to the positive power supply 1510. The output of the comparator 1301 is coupled to a second terminal of the resistor 1504.

The network formed by the resistor 1302 and the capacitor 1303 converts the relatively quick rising and falling edges of the output of the comparator 1501 into relatively slowly rising and falling edges at the input of the comparator 1301. By correctly choosing the threshold at the negative input of the comparator 1303 using the resistors 1306 and 1307, it is possible to introduce some amount of additional delay between when the output of comparator 1501 changes and when the change in threshold at the positive input of the comparator 1501 appears. Such a delay being introduced to the positive feedback hysteresis signal can be shown to have advantages in the ability of the detector 506 to prevent the conversion of relatively short noise pulses which may appear at the detector input into much longer pulses at the output of the detector, which in turn can be used to advantage to further reduce the rate at which errors will occur in the communication process.

In the optical receiver of the present invention as illustrated in FIG. 6, multiple optical receiving transducers 501, 501A and 501B are used to receive data transmissions from an optical transmitter. Unfortunately, unwanted noise and other interfering signals are also received by the transducers 501, 501A and 501B. To eliminate these interfering signals from the signal being transmitted from the detector 506, the received signal is differentiated by the differentiator 503 and amplified by the amplifier 504. The optional elements including the amplifier 502, the filter 505 and the data output circuit 507 can also be included in the optical receiver of the present invention to further condition the signal. If an electronically adjustable amplifier is being used, the gain control feedback circuit 508 should also be included to control the gain of the amplifier 504.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

I claim:

1. A noise tolerant optical receiver for decreasing a level of low frequency and DC components within a received optical signal comprising:
   a. means for receiving an optical signal from an optical signal transmitter;
   b. means for amplifying the optical signal coupled to the means for receiving for creating an amplified optical signal;
   c. means for differentiating the optical signal coupled to the means for amplifying, for receiving the amplified optical signal and creating a differentiated optical signal;
   d. means for filtering coupled to the means for differentiating for removing high frequency components from the differentiated optical signal; and
   e. means for detecting the differentiated optical signal coupled to the means for filtering, for forming an output data stream corresponding to the optical signal received by the means for receiving.

2. The noise tolerant optical receiver as claimed in claim 1 further comprising means for coupling the output data stream to a first digital system.

3. The noise tolerant optical receiver as claimed in claim 2 wherein the optical signal received from the optical signal transmitter is modulated light representing a digital signal from a second digital system.

4. The noise tolerant optical receiver as claimed in claim 3 wherein the means for detecting further comprises means for converting the output data stream into a digital signal.

5. The noise tolerant optical receiver as claimed in claim 1 wherein the means for amplifying comprises a preamplifier and an amplifier and wherein the means for receiving is coupled to an input of the preamplifier and an output of the preamplifier is coupled to an input of the amplifier.

6. The noise tolerant optical receiver as claimed in claim 5 wherein the amplifier is a fixed gain amplifier.

7. The noise tolerant optical receiver as claimed in claim 5 wherein the amplifier is an electronically adjustable gain amplifier.

8. The noise tolerant optical receiver as claimed in claim 1 wherein the means for differentiating comprises a differentiator coupled to the means for amplifying and the means for detecting.

9. The noise tolerant optical receiver as claimed in claim 1 wherein the optical signal is transmitted through a free space medium.

10. A noise tolerant optical receiver comprising:
    a. one or more data channels for receiving a transmitted signal, each data channel comprising a means for receiving an optical signal and an output for coupling the received optical signal to a digital system;
    b. means for amplifying the optical signal having one or more inputs and an output, each input coupled to an output of each of the data channels;
    c. means for differentiating the optical signal coupled to the means for amplifying, for creating an amplified and differentiated optical signal;
    d. means for filtering coupled to the means for amplifying for removing high frequency components from the amplified and differentiated signal; and
    e. means for detecting the amplified and differentiated optical signal coupled to the means for filtering, for creating an output data stream corresponding to the optical signal received by the means for receiving.

11. The noise tolerant optical receiver as claimed in claim 10 wherein the optical signal is transmitted through a free space medium.

12. The noise tolerant optical receiver as claimed in claim 10 further comprising means for transmitting the amplified and differentiated optical signal coupled to the means for detecting.

13. The noise tolerant optical receiver as claimed in claim 12 wherein each data channel further comprises a preamplifier coupled to the means for receiving, for amplifying the level of the received optical signal.

14. The noise tolerant optical receiver as claimed in claim 13 wherein the means for differentiating comprises one or more differentiators each coupled to a data channel and to the means for amplifying.

15. The noise tolerant optical receiver as claimed in claim 13 wherein the means for differentiating comprises a differentiator coupled to the means for amplifying and the means for detecting.

16. A method of removing unnecessary portions of a received optical signal comprising the steps of:
    a. receiving the optical signal from an optical signal transmitter;
    b. amplifying the optical signal;
    c. differentiating the optical signal;
    d. removing high frequency components from the optical signal; and
    e. detecting the amplified and differentiated optical signal and creating an output data stream corresponding to the received optic signal.

17. The method as claimed in claim 16 further comprising the step of coupling the amplified and differentiated optical signal to a digital system.

18. A noise tolerant optical transmission system comprising:
    a. an optical transmitter for transmitting data using a light source;
    b. an optical receiver for receiving the data from the optical transmitter;
    c. a differentiator coupled to the optical receiver for removing lower frequency and DC components from the data and creating a differentiated signal;
    d. an amplifier coupled to the differentiator for amplifying the differentiated signal and creating an amplified signal;

e. a filter coupled to the amplifier for removing high frequency components from the amplified signal; and f. a detector coupled to the filter for detecting the amplified signal and creating an output data stream corresponding to the data received by the optical receiver from the optical transmitter.

19. The noise tolerant optical transmission system as claimed in claim 18 wherein the amplifier is an electronically adjustable gain amplifier.

20. The noise tolerant optical transmission system as claimed in claim 19 further comprising a pre-amplifier coupled to the optical receiver and the differentiator for amplifying the data received by the optical receiver.

21. The noise tolerant optical transmission system as claimed in claim 20 wherein the optical signal is transmitted through a free space medium.

22. The noise tolerant optical transmission system as claimed in claim 18 wherein the amplifier is a fixed gain amplifier.

23. A noise tolerant optical receiver for decreasing a level of low frequency and DC components within a received optical signal comprising:

a. means for receiving an optical signal from an optical signal transmitter;

b. means for differentiating the optical signal coupled to the means for receiving for creating a differentiated optical signal;

c. means for amplifying the optical signal coupled to the means for differentiating for receiving the differentiated optical signal and creating an amplified optical signal;

d. means for filtering coupled to the means for amplifying for removing high frequency components from the amplified signal; and e. means for detecting the amplified optical signal coupled to the means for filtering, for forming an output data stream corresponding to the optical signal received by the means for receiving.

24. The noise tolerant optical receiver as claimed in claim 23 wherein the optical signal is transmitted through a free space medium.

25. The noise tolerant optical receiver as claimed in claim 23 further comprising means for coupling the output data stream to a first digital system.

26. The noise tolerant optical receiver as claimed in claim 25 wherein the optical signal received from the optical signal transmitter is modulated light representing a digital signal from a second digital system.

27. The noise tolerant optical receiver as claimed in claim 26 wherein the means for detecting further comprises means for converting the output data stream into a digital signal.

28. The noise tolerant optical receiver as claimed in claim 23 further comprising a preamplifier coupled to the means for receiving and to the means for differentiating wherein the means for receiving is coupled to an input of the preamplifier and an output of the preamplifier is coupled to an input of the means for differentiating.

29. The noise tolerant optical receiver as claimed in claim 28 wherein the means for differentiating comprises a differentiator coupled between the preamplifier and the means for amplifying so that the output of the preamplifier is coupled to an input of the differentiator and an output of the differentiator is coupled to the means for amplifying.

30. The noise tolerant optical receiver as claimed in claim 23 wherein the means for differentiating comprises a differentiator coupled to the means for amplifying and the means for detecting.

* * * * *

UNITED STATES PATENT AND TRADEMARK OFFICE
CERTIFICATE OF CORRECTION

PATENT NO. : 5,760,942
DATED : June 2, 1998
INVENTOR(S) :
Lawrence Bryant

It is certified that error appears in the above-identified patent and that said Letters Patent is hereby corrected as shown below:

On the title page item [56]:

Insert --Richard C. Allen, "Infrared Wireless Networks", Presentation to IEEE 802.11, Hilton Head, SC, March 11-15, 1991, IEEE Document IEEE P802.11/91-33, March 1991--.

In column 11, line 45, delete "flop-flop" and insert --flip-flop--.

In column 14, line 52, delete "optic" and insert --optical--.

In column 15, line 11, delete "claim 19" and insert --claim 18--.

Signed and Sealed this

Eighth Day of September, 1998

*Attest:*

BRUCE LEHMAN

*Attesting Officer*     *Commissioner of Patents and Trademarks*